Patented Feb. 7, 1950

2,497,024

UNITED STATES PATENT OFFICE 2,497,024

ELECTROCHEMICAL PREPARATION OF α-AMINO-n-BUTYRIC ACID AND N-BENZOYL DERIVATIVE

John H. Billman, Bloomington, Ind.

No Drawing. Application October 5, 1945,
Serial No. 620,644

4 Claims. (Cl. 204—79)

This invention relates to methods of preparing α-amino-n-butyric acid and N-benzoyl-α-amino-n-butyric acid.

The present application is a continuation in part of my co-pending application Serial No. 411,555, filed September 19, 1941, now Patent No. 2,394,230, granted February 5, 1946.

Amino acids have long been recognized as essential to biological processes in most living things and more recently have been utilized to sustain life. Numerous methods have heretofore been employed for the synthesis of these amino acids and more particularly the α-amino acids. For example, some of these methods have been used which involve the amination of α-halogenated acids, the Gabriel synthesis, and the Strecker synthesis. All of these methods, however, have the common disadvantage of being rather lengthy, expensive, and usually yielding small amounts of amino acids.

In accordance with this invention, α-amino-n-butyric acid and N-benzoyl-α-amino-n-butyric acid are prepared by a method which is efficient and economical. This method comprises protecting by the benzoyl group the amino group of β-amino-n-butanol, to form N-benzoyl-β-amino-n-butanol; oxidizing electrochemically the N-benzoyl-β-amino butanol to the corresponding N-benzoyl-α-amino-n-butyric acid, by converting the methylol group of the alcohol to the carboxyl group; and then removing the protecting benzoyl group.

The protection is achieved by reacting the β-amino-n-butanol with a compound containing a benzoyl group which combines with and renders unoxidizable the amino radical of the β-amino alcohol during the subsequent oxidation of the methylol group of the alcohol. Desirably the compound which is reacted with the β-amino alcohol to protect it is benzoyl chloride.

The resultant N-benzoyl β-amino alcohol is then oxidized electrochemically to convert the methylol group of the alcohol to a carboxyl group. This electrochemical oxidation is performed by subjecting an aqueous electrolyte containing the N-protected β-amino alcohol to the action of an electric current. Preferably this electrochemical oxidation is performed between 0° C. and the boiling point of the electrolyte mixture.

After the N-benzoyl-β-amino-n-butanol has been oxidized to the corresponding N-benzoyl-α-amino n-butyric acid, the resulting compound is decomposed to form α-amino n-butyric acid. This decomposition may, for example, be accomplished by hydrolyzing the N-benzoyl-α-amino butyric acid with an acid, such as hydrochloric, sulphuric, or nitric acid, or a base, such as sodium or barium hydroxide.

A typical example of the method in accordance with this invention is as follows:

*Example.—Preparation of α-amino-n-butyric acid*

23.6 grams of β-amino-n-butanol are added to a solution containing 12 grams of sodium hydroxide and 100 cc. of water. Thirty-eight grams of benzoyl chloride are added slowly in small portions, with stirring, to this mixture. The benzoyl derivative, which is N-benzoyl-β-amino-n-butanol, separates out as an oil, which crystallizes on standing. It is represented by the following formula:

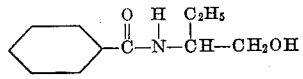

Ten grams of this N-benzoyl-β-amino-n-butanol, finely divided, are suspended in 500 cc. of water containing 10 cc. of concentrated sulfuric acid (sp. gr. 1.83). An electric current of 1.7 amperes is passed through the solution for four hours, during which time the solution is stirred vigorously. The oxygen set free at the anode oxidizes the N-benzoyl-β-amino-n-butanol to N-benzoyl-α-amino-n-butyric acid, by oxidizing the methylol group of the alcohol to the carboxyl group of the acid. The unreacted starting material (about 1 g.) is filtered off, and the solution is reduced by evaporation to about 75 cc. By treatment with 20 percent hydrochloric acid the N-benzoyl-α-amino-n-butyric acid loses its benzoyl group and is converted into α-amino-n-butyric acid hydrochloride. The benzoic acid formed by the removed benzoyl group is removed by filtration. The filtrate is evaporated to dryness, and the residue of α-amino-n-butyric acid hydrochloride is suitably converted into the desired free α-amino-n-butyric acid, as by treatment with aniline.

What is claimed is:

1. In the process of producing a composition selected from the class consisting of α-amino-n-butyric acid and N-benzoyl-α-amino-n-butyric acid, the steps which consist in reacting β-amino-n-butanol and benzoyl chloride, and electrochemically oxidizing the resulting N-benzoyl-β-amino-n-butanol by passing a moderate electric current through an acidic aqueous solution containing it.

2. In the process of producing a composition selected from the class consisting of α-amino-n-butyric acid and N-benzoyl-α-amino-n-butyric acid, the step which consists in electrochemically oxidizing N-benzoyl-β-amino-n-butanol by passing a moderate electric current through an acidic aqueous solution containing it.

3. The process of producing α-amino-n-butyric acid, which consists in reacting β-amino-n-butanol with benzoyl chloride, electrochemically oxidizing the resulting N-benzoyl-β-amino-n-butanol by passing a moderate electric current through an acidic aqueous solution containing it, and removing the benzoyl radical from the resulting N-benzoyl-α-amino-n-butyric acid by hydrolysis.

4. The method of producing α-amino n-butyric acid, which consists in electrochemically oxidizing N-benzoyl-β-amino-n-butanol by passing a moderate electric current through an acidic aqueous solution containing it, and removing the benzoyl group from the resultant N-benzoyl-α-amino-n-butyric acid by hydrolysis.

JOHN H. BILLMAN.

REFERENCES CITED

The following references are of record in the file of this patent:

UNITED STATES PATENTS

| Number | Name | Date |
|---|---|---|
| 789,269 | Ellis | May 9, 1905 |
| 2,394,230 | Billman | Feb. 5, 1946 |

FOREIGN PATENTS

| Number | Country | Date |
|---|---|---|
| 726 | Great Britain | Jan. 11, 1909 |

OTHER REFERENCES

Brockman, Electroorganic Chemistry, Wiley and Sons, (1926), p. 86.

Glasstone et al., Electrolytic Oxidation and Reduction, Van Nostrand Co., (1936), pp. 329–330.